United States Patent [19]

Liu

[11] Patent Number: 5,480,306
[45] Date of Patent: Jan. 2, 1996

[54] LANGUAGE LEARNING APPARATUS AND METHOD UTILIZING OPTICAL CODE AS INPUT MEDIUM

[76] Inventor: Chih-Yuan Liu, No. 529 Chungshan Road, Chi-Pei City, Hsinchu Hsien, Taiwan

[21] Appl. No.: 213,744

[22] Filed: Mar. 16, 1994

[51] Int. Cl.[6] .................................................. G09B 19/00
[52] U.S. Cl. ..................... 434/156; 434/157; 434/118; 364/419.01; 235/462; 381/52
[58] Field of Search ..................................... 434/118, 156, 434/157, 169, 170, 185, 201, 307 R, 308, 317, 325, 335, 355, 359; 382/10; 364/419.01, 419.02; 235/454, 457, 462, 468, 472, 494; 250/206, 208.2, 208.4, 221; 358/474, 481; 369/97; 381/52

[56] References Cited

U.S. PATENT DOCUMENTS

| 4,337,375 | 6/1982 | Freeman . | |
|---|---|---|---|
| 4,375,058 | 2/1983 | Bouma et al. . | |
| 4,435,164 | 3/1984 | Weber | 434/201 X |
| 4,457,719 | 7/1984 | Dittakavi et al. . | |
| 4,466,801 | 8/1984 | Dittakavi et al. . | |
| 4,505,682 | 3/1985 | Thompson . | |
| 4,549,867 | 10/1985 | Dittakavi . | |
| 4,570,250 | 2/1986 | Gabritsos et al. | 369/97 |
| 4,602,152 | 7/1986 | Dittakavi | 434/169 X |
| 4,891,011 | 1/1990 | Cook | 434/157 |
| 5,001,696 | 3/1991 | Baldwin | 434/308 X |
| 5,059,126 | 10/1991 | Kimball . | |
| 5,314,336 | 5/1994 | Diamond et al. | 434/169 |

*Primary Examiner*—Joe H. Cheng
*Attorney, Agent, or Firm*— Bo-In Lin

[57] ABSTRACT

A language learning apparatus using optical code as input medium is disclosed. An optical code/bar code is associated with each of a number of words, sentences, animal cries and sounds of music instruments. The pronunciations of the words and sentences, the animal cries and the sounds of the music instruments are digitalized and stored in storage memory in advance. An optical code reader is used to converted the optical codes into an associated electrical signal which is then converted into memory address pointed to the associated digital sound data stored in the storage memory. The digital sound data are then accessed by using the memory address and converted into an analog signal to be spoken out by a loudspeaker system. The digital sound data may comprise the pronunciations of more than one language so as to enhance the learning of different languages in an interactive manner.

16 Claims, 7 Drawing Sheets

OPTICAL CODE/BAR CODE

OUTPUT ELECTRICAL SIGNAL

| OPTICAL CODE | DIGITAL CODE | WORD |
|---|---|---|
|  | 0001 | a |
|  | 0002 | able |
|  | 0003 | about |
|  | 0004 | above |
| ⋮ | ⋮ | |

| CHARACTER | BAR CODE | CHARACTER | BAR CODE |
|---|---|---|---|
| 0 |  | M |  |
| 1 |  | N |  |
| 2 |  | O |  |
| 3 |  | P |  |
| 4 |  | Q |  |
| 5 |  | R |  |
| 6 |  | S |  |
| 7 |  | T |  |
| 8 |  | U |  |
| 9 |  | V |  |
| A |  | W |  |
| B |  | X |  |
| C |  | Y |  |
| D |  | Z |  |
| E |  | + |  |
| F |  | − |  |
| G |  | * |  |
| H |  | / |  |
| I |  | % |  |
| J |  | $ |  |
| K |  | . |  |
| L |  | (space) |  |

| DIGITAL CODE | MEMORY ADDRESS |
|---|---|
| 0001 | 0000 |
| 0002 | mmmm |
| 0003 | nnnn |
| 0004 | pppp |
| ⋮ | ⋮ |

FIG. 5A

| ADDRESS | MEMORY |
|---|---|
| 0000 | rrrr |
| ⋮ | ⋮ |
| rrrr | mmmm−rrrr |
| ⋮ | ⋮ |
| mmmm−1 | |
| mmmm | ssss |
| | ⋮ |
| mmmm+ssss | nnnn−mmmm−ssss |
| ⋮ | ⋮ |
| nnnn−1 | |
| nnnn | tttt |
| | ⋮ |
| nnnn+tttt | pppp−nnnn−tttt |
| | ⋮ |
| pppp−1 | |
| pppp | |
| ⋮ | ⋮ |

FIG. 5B

LANGUAGE LEARNING APPARATUS AND METHOD UTILIZING OPTICAL CODE AS INPUT MEDIUM

FIELD OF THE INVENTION

The present invention relates to a language or pronunciation learning aid and in particular to a language learning aid using optical code/bar code as input medium and audio speech as output medium.

BACKGROUND OF THE INVENTION

Speech and sound learning apparatus has been available in market in a number of different forms. For example, SPEAK & SPELL, SPEAK & MATH, and SPEAK & READ, all being trademarks of Texas Instrument Incorporated, which show questions on display means and receives answer inputted from keyboard. The devices then provide correct answers. Some of the speech and sound learning apparatus also provide communication of synthesized audio signals to help the operator to learn.

The input means, keyboard, of these devices is obviously difficult for young child user. To overcome such a problem, optical code reading devices, such as bar code reader, are used to replace the keyboard input for reading symbols. In some devices, electronic speech synthesizer is also incorporated to provide communication with the operator or user with synthesized speech. A typical example is U.S. Pat. No. 4,337,375 issued on Jun. 29, 1982 to Freeman, entitled "Manually Controllable Data Reading Apparatus for Speech Synthesizers", which uses optical codes to identify speech factors, such as phoneme, identity, inflection, duration and syllabic identity. The optical codes are read by optical code reader and stored in buffer memory and then spoken out by speech synthesizer.

U.S. Pat. No. 4,375,058, issued on Feb. 22, 1983 to Bouma et al., entitled "Device for Reading a Printed Code and for Converting This Code into an Audio Signal" discloses a device which uses optical code reader to read optical code and stores this code in an intermediate memory to be directly transmitted to speech synthesizer for generation of audio signals. Alternatively, the contents of the intermediate memory is a memory address in which the information of an object is stored. The object memory is then accessed by speech synthesizer to generate audio signals. The information supplied to the speech synthesizer is still those speech factors mentioned previously. Other electronic learning aids using optical input and synthesized speech output include U.S. Pat. No. 4,457,719 to Dittakavi et al. which provides sequencing and spelling exercises audibly, U.S. Pat. No. 4,466,801 to Dittakavi et al. which is capable to repeat an element of non-spoken sound and to generate a relatively long sound effects from short coded indicia, U.S. Pat. No. 4,505,682 to Thompson which provides functions of matching and comparing, U.S. Pat. No. 4,549,867 to Dittakavi et al. which may shore a number of sound identifications generated by passing the optical reader over a sequence of bar codes in queue memory to allow them to be spoken out sequentially or alternatively, produces an audible random sequence of sounds and asks an operator to the use optical code reader to select the right sequence of the codes with a number of optical codes and the device will indicate if it is correct.

The above-described prior art technique uses either keyboard or optical code reader as input means and generates output with synthesized speech to enhance the learning effectiveness. The synthesized speech, although quite close to human voice and good enough to have people understand, is different from the human voice. For an operator wishing to learn correct pronunciation of a language, this is quite a deficiency. Therefore, under such a situation, true human voice is the only choice. U.S. Pat. No. 5,059,126 issued on Oct. 22, 1990 to Kimball, entitled "Sound Association and Learning System" discloses a device which speaks with true human voice. However, Kimball uses compact discs (CD) to store the true human voice and uses a CD player to play back the contents of the CDs. A disadvantage is that the CD player is quite sensitive to shock and vibration and if it is to be operated by a young child, the CD player will be easy to damage.

Besides, the conventional device using optical code reader as input means and adapting synthesized speech as output means has another disadvantage that is that the length of the optical code depends upon the contents of the speech factors and thus for a lengthy sentence, the optical code may be too long to be printed in a single line. This is obviously inconvenient.

SUMMARY OF THE INVENTION

It is an objective of the present invention to provide a language learning apparatus using optical code/bar code as input medium for conversion of optical code/bar code into true human speech or natural sound, each of the optical codes having a fixed length and associated with a particular word, sentence or picture, so that users may enter the optical code with an optical code reader which optical code will be recognized by the language learning apparatus and played back with loudspeaker system with true human voice or natural sound.

In accordance with an aspect of the present invention, words of different language, animals, music instruments and so on are printed in association with optical codes on visible media, such as paper, plastic slide. The pronunciations of the words, the cries of the animals and the sounds of the music instruments are recorded and stored in a digitalized manner and is assigned with an memory address associated with the optical codes thereof. The optical code of a specific word is entered by an optical code reader and then converted into an electrical signal which is further converted into a digital code. An associated memory address pointer pointing to the initial address of the memory area in which the digital sound or pronunciation is stored is generated by using the digital code. The digital data of the memory area are retrieved and processed to format analog signal to be applied to a loudspeaker system. In this way, the user may use the optical code reader to scan the optical code associated with a word to hear the pronunciation of-true human speech thereof. The user may also use the optical code reader to enter the optical code associated with an animal or a music instrument to hear the cry or the sound thereof. Alternatively, the user may choose to play back the pronunciations of a word in different languages in a sequential combination manner. For example, the user may choose to play back the name of an animal and the cry of the animal. Thus an interactive language learning process can be performed.

BRIEF DESCRIPTION OF THE DRAWINGS

The present invention will be better understood from the following description of a preferred embodiment of the present invention, with reference to the drawings, wherein:

FIGS. 5A and 5B show examples of correspondence between digital codes and the initial memory address and the digital sound data storage memory block;

DETAILED DESCRIPTION OF THE PREFERRED EMBODIMENT

Figure 1:
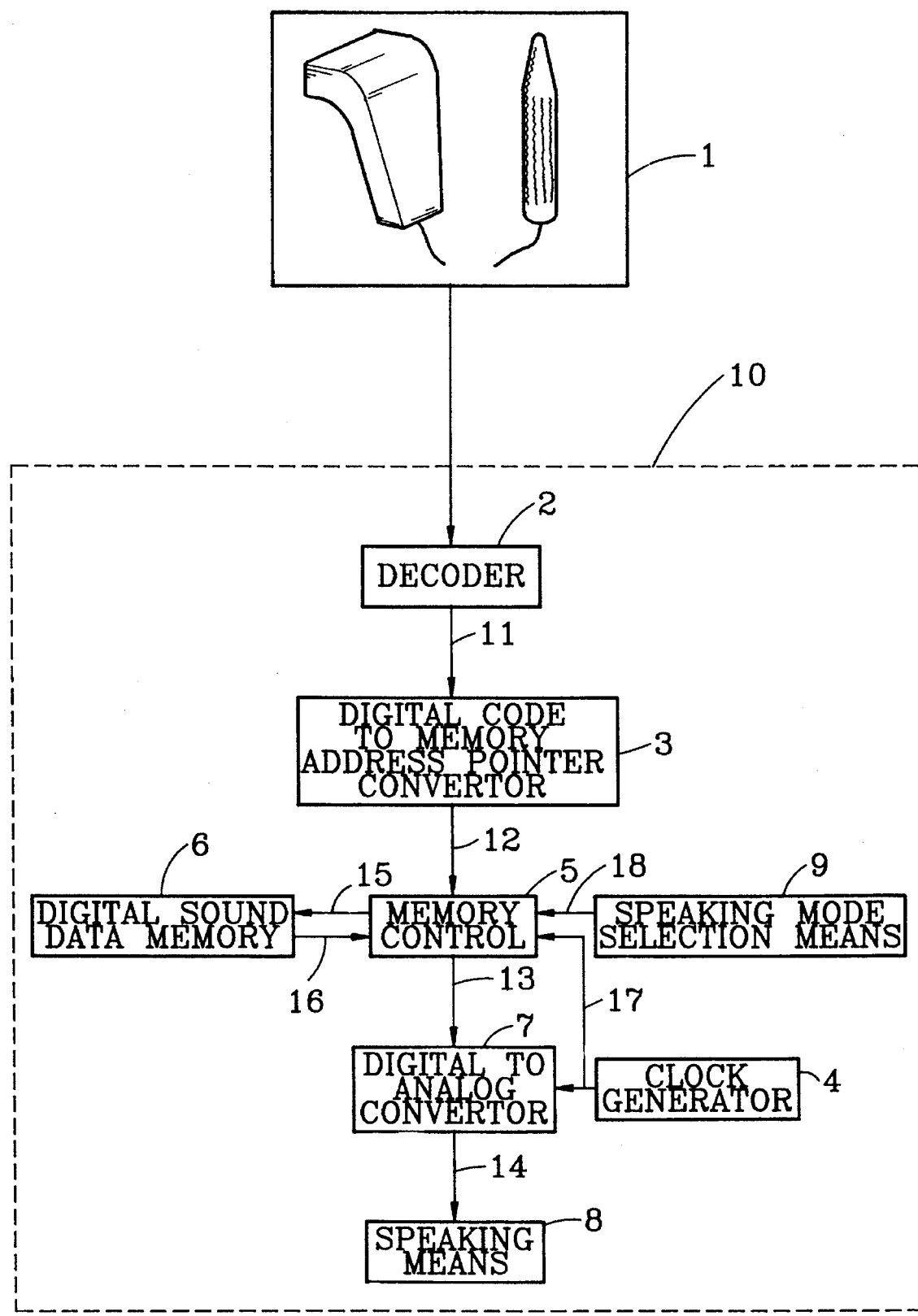
FIG. 1 shows a block diagram of a language learning apparatus using optical code as input medium constructed in accordance with the present invention.

With reference to the drawings and in particular FIG. 1, wherein a block diagram of an embodiment of a language learning apparatus using optical code/bar code as input medium constructed in accordance with the present invention, generally designated with the reference numeral 10, is shown, the apparatus 10 comprises an optical code reader 1 which may be a commercially available wand type optical reader or a handheld bar code reader.

The apparatus 10 further comprises decoder means 2 to receive output electrical signal from the optical code reader 1 and covert the received electrical signal into digital code 11 constituted by digits. The digital code 11 is then processed by digital code to initial memory address pointer converter means 3 to be converted into initial memory address pointer 12 by which memory control means 5 is operated by sampling clock frequency 17 provided by clock generator 4 and controlled by speaking mode 18 selected by speaking mode selection means 9 accesses and retrieves digital sound data 13 from digital sound data memory means 6 via data output terminal 16 thereof. The so retrieved digital sound data 13 are then transmitted to digital to analog converter means 7 to be converted into analog signal 14 which is then applied to speaking means 8 for generating audio signal.

Figure 2:
FIG. 2 shows output electrical signal converted from optical code/bar code read by an optical code reader.
Figure 2:
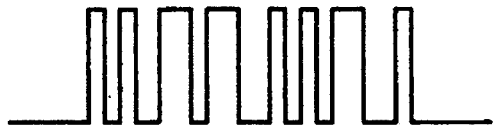

FIG. 2 shows the relationship between the electrical signal outputted from the optical code reader 1 and the optical code/bar code read by the optical code reader 1. In general, logic "1" is assigned to represent black bar and logic "0" is assigned to represent white bar. A wider black bar may generate succeeding logic "1s". Similarly, a wider white bar may result in succeeding logic "0s". By different combinations of the wide and thin black and white bars, a so-called bar code is formed. Generally, the currently used bar codes include code 3 of 9, EAN (European Article Number) code, UPC (Universal Product Code) code, interleaved 2 of 5 code, CODEBAR code and 128 code.

Figure 3:
FIG. 3 shows the codes 3 of 9 of the numeric-alphabetic characters.
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:

As an illustration, the code 3 of 9 will be used as an example to explain the present invention. However, it is known that other coding may also be applicable. FIG. 3 shown examples of the codes 3 of 9 and the associated numerical-alphabetic characters.

Figure 4:
FIG. 4 shows examples of the optical codes as well as digital codes of English words.
Figure 4:
Figure 4:
Figure 4:

FIG. 4 shows examples of the association of the optical codes with the digital codes and the English words. The words are arranged or assigned in advance to be represented by the associated digital codes. In the embodiment illustrated, digital code "0001" is appointed to represent the English character "a", digital code "0002" the English word "able" and so on. In other words, the digital code "0001" will be converted into address pointer "0000" by being processed by the digital code to initial memory address pointer converter means 3. Similarly, the second digital code "0002" will be converted into address pointer "mmmm", the third digital code "0003" converted into address pointer "nnnn" and so on. As shown in FIG. 5A, the digital sound data of the English character "a" is stored in an area of the digital sound data memory means 6 addressed from "0000" to "mmmm−1". Within this area, a segment thereof containing memory elements of the addresses from "0000" to "rrrr−1" stores digital speech data of a first language associated with the character "a" and a segment thereof with the addresses from "rrrr" to "mmmm−1" stores digital speech data of a second language associated with the character "a". Similarly, the digital speech data of the first language of the word "able" is stored in the memory means from address "mmmm" to "mmmm+ssss−1" and that of the second language is stored in address from "mmmm+ssss" to "nnnn−1" of the memory means 6 and so on. As shown in FIG. 5B, each area that stores a digital speech data of a word has a first address in which the length of the digital speech data of the word is stored. By this way, the memory control means 5 may properly retrieve the desired digital speech data of the word from the memory means 6.

Figure 6:
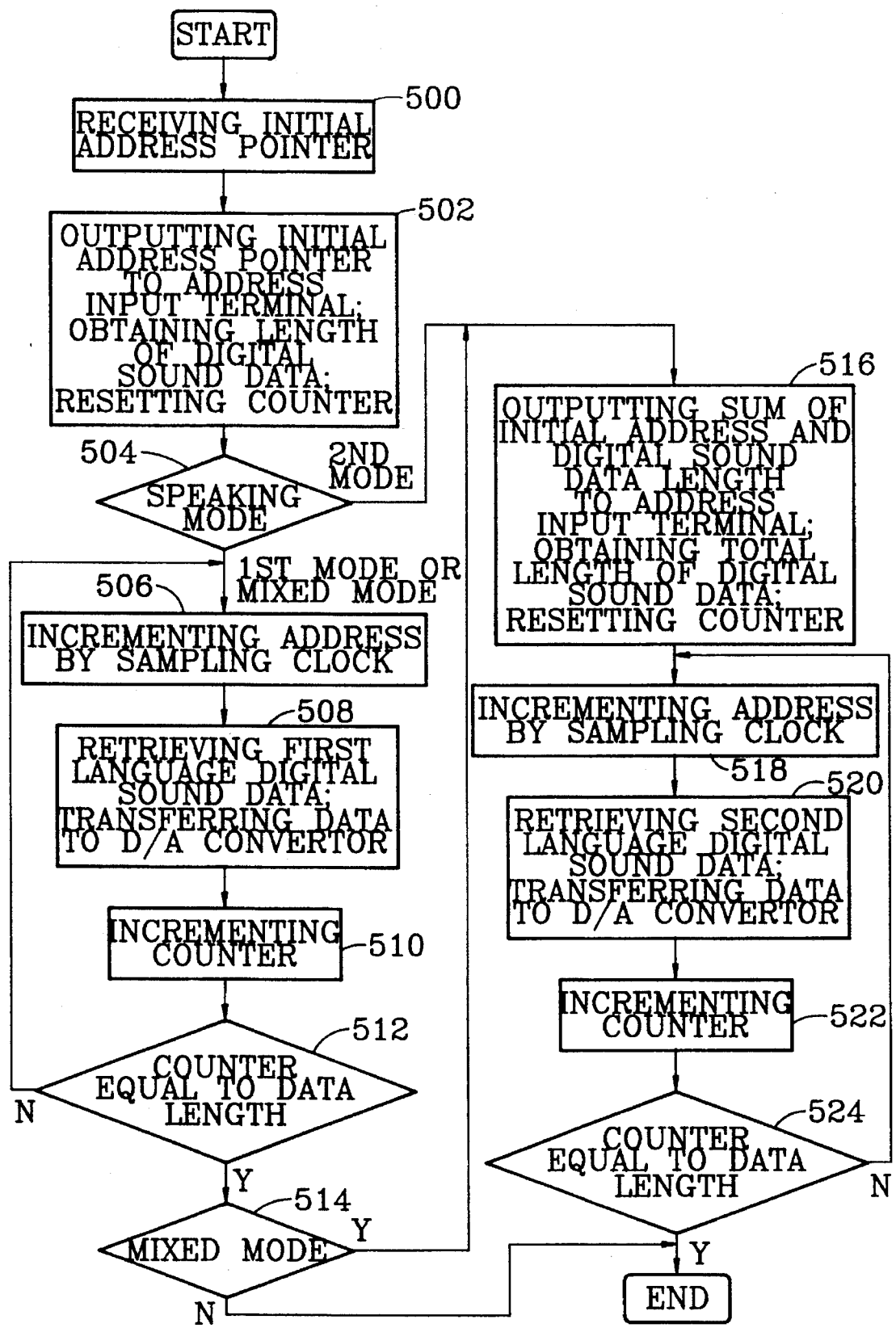
FIG. 6 shows a flow chart of the operation of the memory control means.

FIG. 6 shows a flow chart of the present invention. The memory control means 5 receives the initial memory address pointer 12 at the initial step 500. At step 502, an address signal corresponding to the initial memory address pointer 12 is applied to address input terminal 15 of the digital sound data memory means 6 to obtain the length of digital sound data of the first language via data output terminal 16 of the digital sound data memory means 6. If the speaking mode 18 selected by using the speaking mode selection means 9 is the first language (step 504), the address applied to the address input terminal 15 is sequentially incremented according to the sampling clock frequency 17 generated by the clock generator means 4 (step 506) to retrieve the first language digital sound data via the data output terminal 16 of the digital sound data memory means 6 (step 508) until the length of the retrieved data is equal to the length of the first language digital sound data (steps 510 and 512). If the speaking mode 18 is selected to be the second language, the memory control means 5 adds the data length obtained from step 502 to the initial memory address pointer 12 and transmits the sum thereof to the address input terminal 15 of the digital sound data memory means 6 to obtain the length of the second language digital sound data (step 516). The address signal applied to the address input terminal 15 is sequentially incremented according to the sampling clock frequency 17 of the clock generator 4 (step 518) to retrieve the second language digital sound data via the data output terminal 16 (step 520) until the length of the retrieved data is equal to the length of the second language digital sound data (steps 522 and 524). If the speaking mode 18 is selected to be a mixed mode of the first and second languages, then the memory control means 5, after completing the retrieval of the first language digital sound data from the memory means 6 (steps 506–512), with a decision made at step 514, jumps to step 516 to continue to retrieve the second language digital sound data (steps 516–524).

The digital sound data that are retrieved from the digital sound data memory means 6 at the above procedure are applied to the digital to analog converter means 7 at step 508 or 520. The operating frequency of the digital to analog converter 7 is preferably the same as the sampling clock frequency 17 provided by the clock generator 4 and is essentially the same as the sampling frequency used to digitalize audio signal (sound) which forms the digital sound data. An example of the frequency is 8,000 bytes per second. However, it may be possible to provide speed control means (not shown) to allow a user to speed up and/or slow down the play-back of the digital sound data by changing the clock frequency 17.

The analog signal 14 obtained from the digital to analog converter means 7 is then applied to speaking means 8, such as a loudspeaker system to be "spoken out".

To make the present invention more useful, it may add patterns of "function codes" to the optical code/bar code to provide the optical code/bar code with additional function so that when an "R" function code is added to a digital code, it stands for that the optical code/bar code that is scanned in with the optical code reader is correct. For example, the digital code "0002R" means that the answer "able" is correct and a speech "ABLE, you are correct." will be provided. When a "W" function code is added, it means that the user is wrong. For example, the digital code "0003W" stands for that the answer "about" is wrong and the present invention will provide a speech "ABOUT, you are wrong. Please try again." to indicate the incorrectness. A "Q" function code stands for question. For example, the digital code "0001Q" indicates that the user is to find out the character "a" and the present invention will signal the user with a speech "Please find out the letter A."

The function codes "R", "W" and "Q" will be assigned with individual and unique digital codes and the associated sound data are digitalized and stored in advance.

Figure 7:
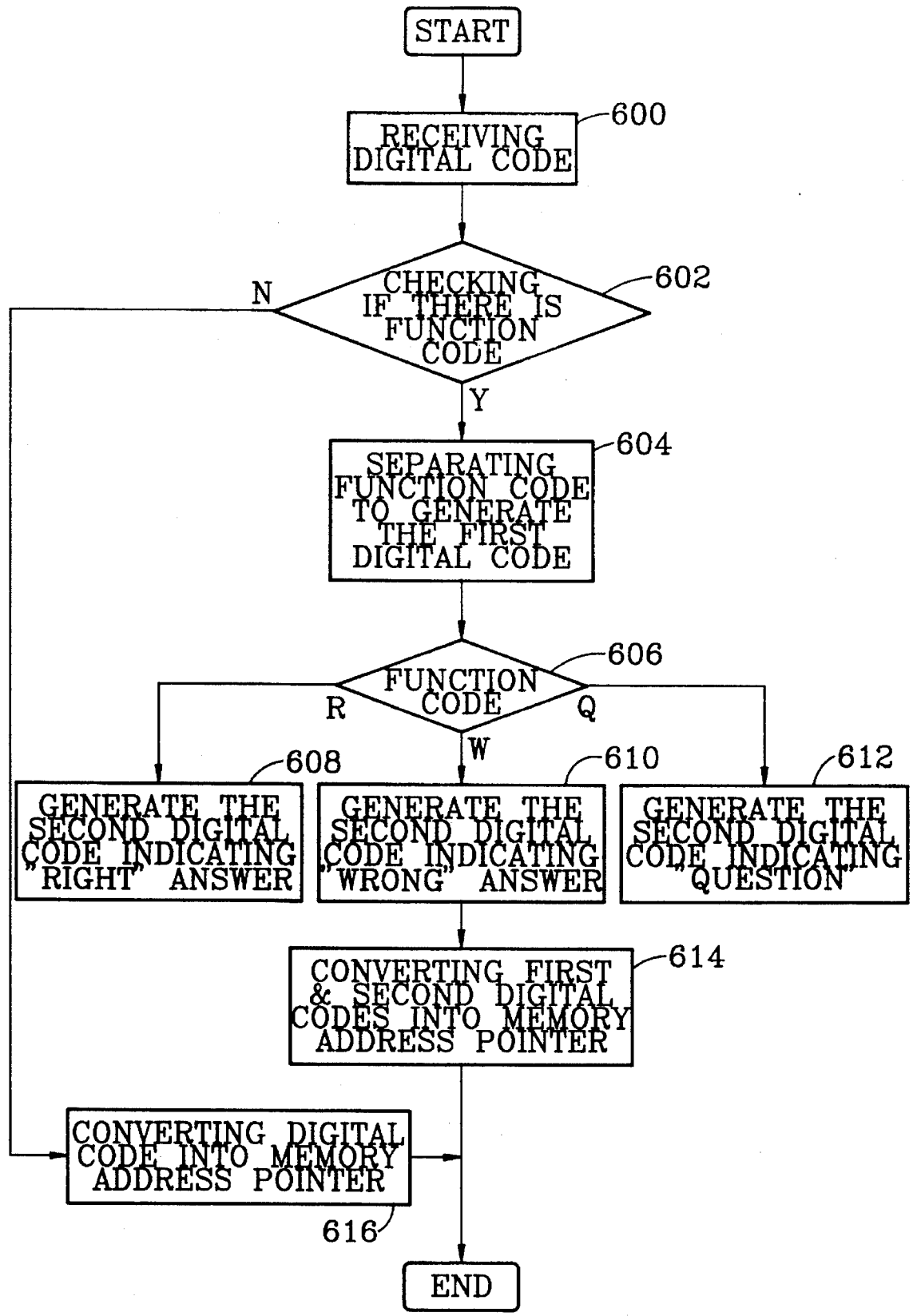
FIG. 7 shows a flow chart of the digital code to memory address pointer converter.

FIG. 7 shows a flow chart of the operation of the digital code to memory address pointer converter 3. The digital code to memory address pointer converter 3 receives the digital code 11 outputted from the decoder means 2 (step 600) and then checks if a function code is present (step 602). If there is no function code, then the digital code 11 is converted into the memory address pointer 12 (step 616). Otherwise, the function code will be separated from the digital code 11 and the digital code that is separated and thus containing no function code is used to generate a first digital code (step 604). The type of the separated function code is checked for the generation of the digital code associated with the function code, which is referred to as the second digital code, such as function code "R" stands for "correct" and a speech indicating that the operator is correct is provided (step 608), function code "W" stands for "wrong" and a speech indicating that the operator is wrong is provided (step 610), and function code "Q" stands for "question", and a question is provided (step 612). The first and second digital codes will be then converted into corresponding memory address pointers 12 (step 614). The function codes "R", "W" and "Q" are only examples of the present invention and there may be other function codes, such as "repeat", "encourage" and "console".

The digital sound data that are stored in the digital sound data memory means 6 may be compressed in advance in order to save the storage space provided by the digital sound data memory means 6. The compressed data may be decompressed by the memory control means 5 when retrieved from the digital sound data memory means 6.

Figure 8:
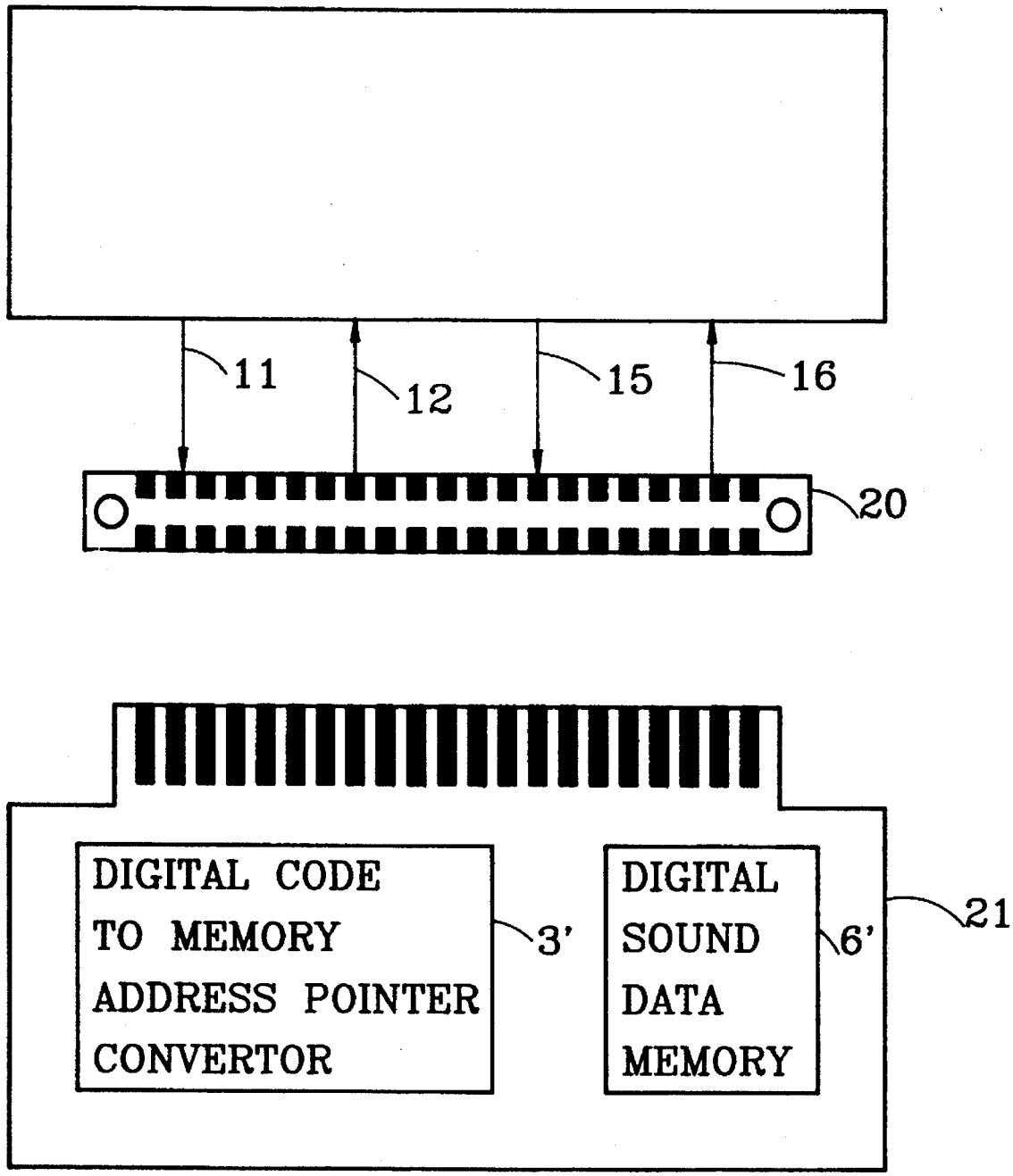
FIG. 8 shows the connection of the language learning apparatus of the present invention with an external cartridge.

Besides the data stored in the digital sound data memory means 6, there may be provided external data storage, such as a data storage cartridge 21 shown in FIG. 8. The cartridge 21 may be connected to the language learning apparatus 10 of the present invention by means of a connector 20 which is in connection with the language learning apparatus 10. The cartridge 21 may have additional digital sound data memory means 6' and digital code to memory address pointer converter means 3' to store more data to be accessed by the memory control means 5 via the connector 20.

As is known to those having ordinary skills, the digital sound data stored in the digital sound data memory means 6 may comprise pronunciations of words of different languages, sounds produced by different music instruments, animal cries and other natural sounds. These sounds may be played back individually or in sequential combination, as described previously.

It is apparent that although the invention has been described in connection with the preferred embodiment, it is contemplated that those skilled in the art may make changes to the preferred embodiment without departing from the spirit and scope of the invention as defined in the appended claims.

What is claimed is

1. A language learning apparatus comprising:

an optical code reader for scanning and converting an optical code into an electrical signal, wherein each optical code including a digital code and a function code;

decoder means for converting the electrical signal outputted from the optical code reader into digital code;

digital sound data memory means for storing therein digital sound data corresponding to pronunciation of different languages and natural sounds relating to an object represented by said optical code formed separately in advanced;

digital code to memory address pointer converter means for converting the digital code into an initial memory address pointer associated with an area of said memory means in which associated digital sound data are stored;

clock generator means for providing a sampling clock of a first frequency;

speaking mode selection means for setting different language speaking modes;

memory control means for retrieving the digital sound data stored in said area of the memory means in response to the initial memory address pointer, the sampling frequency of said clock generator means and the setting of said speaking mode selection means;

digital to analog converter means for converting the digital data retrieve from said area of the memory means into analog signal; and speaking means for converting the analog signal obtained from said digital converter means into audio signal corresponding to different languages for said optical code at a first speed in accordance with said first frequency.

2. An apparatus as claimed in claim 1 wherein:

the digital sound data comprise pronunciations of a first language, a second language, and natural sounds relating to an object represented by said optical code for playing back by said speaking means under the control of said speaking mode selection means.

3. An apparatus as claimed in claim 2 wherein:

said speaking mode selection means being provided for selection of playing back pronunciations of different languages in different modes including a mode of single pronunciation, sequential multiple pronunciations and pronunciations with natural sounds relating to an object represented by said optical code.

4. An apparatus as claimed in claim 1 further comprising:

a connector for connecting to a cartridge provided with external memory means for storing additional digital sound data representing pronunciations of different languages and associated digital code to memory address pointer for generating a pointer pointing to said additional sound data from said external memory means.

5. An apparatus as claimed in claim 1 wherein:

speaking mode selection means further controlling said clock generator means for selectively generating a sampling clock of a second frequency, different from said first frequency; and said memory control means applying said second frequency for accessing said area of the memory means for controlling output of said audio signal from said speaking means.

6. An apparatus as claimed in claim 1 wherein:

said memory means further including function code storage means for storing a plurality function codes therein; and said digital code to memory address pointer converter means further generating pointers pointing to said function code storage means for retrieving a corresponding function code therefrom in response to a optical code which includes a function code input wherein said functional codes being provided for responding with language learning enhancement functions including questioning, encouragement; correction, repetition of questions, and sounds associated with an user identified object.

7. An apparatus as claimed in claim 1 wherein:

said digital code to memory address pointer converter means further generating pointers pointing to said memory means for retrieving the digital sound data stored therein as compressed digital data.

8. An apparatus as claimed in claim 7 wherein:

said memory control means further including a decompressing means for decompressing said compressed digital data upon retrieved from said memory means.

9. A language learning method comprising the following steps:

(1) receiving a plurality of optical codes as input and converting each of the optical codes into electrical signal by using an optical code reader, wherein each optical code including a digital code and a function code;

(2) converting the electrical signal outputted from the optical code reader into digital code;

(3) converting the digital code into an initial memory address pointer pointing to an area of memory means where associated digital sound data corresponding to pronunciations of multiple languages and natural sound relating to an object represented by said optical code are stored;

(4) providing a sampling clock of a first frequency;

(5) setting different language speaking modes;

(6) retrieving the digital sound data stored in said area of the memory in response to the initial memory address pointer, the sampling frequency and the setting of the speaking mode;

(7) converting the digital data retrieved from said area of the memory means into analog signal; and (8) converting the analog signal into audio signal at a first speed in accordance with said first frequency.

10. A method as claimed in claim 9 wherein the step (3) further comprising a step of:

storing pronunciations of said multiple languages and natural sounds relating to an object represented by said optical code for retrieval and playback.

11. A method as claimed in claim 10 wherein the step (6) in retrieving the digital sound data stored in said area of the memory means further comprising a step of:

arranging the sequence of retrieving the digital sound data for providing selection of playing back pronunciations of multiple languages in different modes including a mode of single pronunciation, sequential multiple pronunciations and pronunciations with natural sounds relating to an object represented by said optical code.

12. A method as claimed in claim 10 wherein said step (3) in storing pronunciations of said multiple languages and natural sounds further comprising a step of:

compressing the digital sound data for storing in said memory means.

13. A method as claimed in claim 12 wherein said step in retrieving the digital sound data stored in said area of the memory means further comprising the step of:

retrieving the compressed digital sound data therefrom and decompressing said compressed data when said data being retrieved from said memory means.

14. A method as claimed in claim 9 further comprising the step of:

selectively generating a sampling clock of a second frequency, different from said first frequency, for accessing said area of the memory means at different speed so as to retrieve the digital sound data and converting the analog signal into audio signal at a second speed in accordance with second frequency.

15. A method as claimed in claim 9 further comprising a step of:

connecting a cartridge for providing external memory means for storing additional digital sound data representing pronunciations of different languages for retrieving and generating audio signals using said additional sound data from said external memory means.

16. A language leaning method comprising the following steps:

(1) forming a plurality of optical codes by structuring each code into two separate and independent portions including a digital code and a function code;

(2) scanning and converting the optical code into electrical signal by using an optical code reader;

(3) converting the electrical signal outputted from the optical code reader into first subcode corresponding to said digital code and second subcode corresponding to said function code;

(4) respectively converting the first and second subcodes into first and second initial memory address pointers pointing to locations of memory means where associated digital sound data and functional codes are stored, wherein digital sound data including pronunciations of different languages and natural sound relating to an object represented by said optical code and wherein said functional codes being provided for responding with language learning enhancement functions including questioning, encouragement; correction, repetition of questions, and sounds associated with an user identified object;

(5) retrieving the associated digital sound data and functional codes from the memory means and converting the digital sound data and functional codes into analog signals to be broadcasted by speaking means.

\* \* \* \* \*